United States Patent Office 2,944,044
Patented July 5, 1960

2,944,044

POLYMER BLEND OF A CARBOXYL-CONTAINING MONOVINYLIDENE AROMATIC POLYMER AND A CARBOXYL-CONTAINING CONJUGATED 1,3-DIENE POLYMER

Massimo Baer, Longmeadow, Mass., assignor to Monsanto Chemical Company, St. Louis, Mo., a corporation of Delaware No Drawing. Filed June 9, 1958, Ser. No. 740,546

9 Claims. (Cl. 260—45.5)

The present invention relates to tough polymer blends. More particularly, the present invention relates to an intimate blend of two thermoplastic materials, one of which is a polymer of a monovinylidene aromatic compound having carboxyl groups on the polymer chain and the second of which is a rubbery polymer of a conjugated 1,3-diene having carboxyl groups on the polymer chain.

In the fabrication of rigid plastic articles such as combs, toys, refrigerator panels, plastic pipe, etc. it would be highly desirable to have available to the art a relatively inexpensive plastic material possessing the properties of; (1) high impact strength, (2) high tensile strength, (3) high heat distortion temperature, especially above 100° C., and (4) low deformation under load. The reasons for desiring a thermoplastic material possessing the above properties are obvious.

It has been discovered that thermoplastic compositions possessing the above noted physical properties, i.e., high impact strength, high tensile strength, high heat distortion temperature and low deformation under load, can be prepared by intimately blending together a major proportion of a rigid, water-insoluble polymer of a monovinylidene aromatic compound containing an average of 3–35 and preferably 9–30 carboxyl groups per each 100 monomeric units in the polymer chain, with a smaller proportion of a rubbery polymer of a conjugated 1,3-diene containing an average of 1.5–30 and preferably 5–22 carboxyl groups per each 100 monomeric units in the polymer chain. The carboxyl group-containing polymer of the monovinylidene aromatic compound is customarily prepared by interpolymerizing a monovinylidene aromatic compound such as styrene with a carboxyl group-containing alpha, beta ethylenically unsaturated compound such as acrylic or methacrylic acid. Similarly, the carboxyl group-containing polymer of the conjugated 1,3-diene is customarily obtained by copolymerizing a conjugated 1,3-diene with a carboxyl group-containing alpha, beta ethylenically unsaturated compound such as acrylic or methacrylic acid.

The following examples are set forth to illustrate more clearly the principle and practice of this invention to those skilled in the art. All parts are by weight.

RIGID POLYMER A

A rigid styrene interpolymer containing approximately 14 carboxyl groups for each 100 monomeric units in the polymer chain is prepared as follows:

Two hundred parts of water, 1 part of dodecylamine (neutralized with about a 10% stoichiometric excess of hydrochloric acid) and 0.2 part of potassium persulfate are charged to a reaction flask and heated to reflux. A monomer mixture consisting of 88 parts styrene, 12 parts methacrylic acid and 0.1 part t-dodecyl mercaptan is added to the reaction flask with stirring at a steady rate over a 2-hour period while maintaining reflux. At the end of this period, the polymerization is complete. The latex contains approximately 33% solids.

RIGID POLYMERS B—H

Additional rigid polymers are prepared by the technique described above except for (1) modification of the monomer mixture charged to the polymerization or (2) the emulsifying agent employed. Details on the preparation of these rigid polymers are set forth in Table I.

Table I

| Rigid Polymer | Polymer Composition, Wt. Percent | | | Carboxyl Groups per 100 monomeric units | Polymerization Emulsifier | Emulsifier Concentration, parts/100 parts of monomer |
|---|---|---|---|---|---|---|
| | Styrene | Alpha-Methyl Styrene | Methacrylic Acid | | | |
| B | 82 | | 18 | 21 | DDA.HCl [1] | [2] 1 |
| C | 76 | | 24 | 28 | DDA.HCl | [2] 1 |
| D | 58 | 30 | 12 | 15 | DDA.HCl | [2] 1 |
| E | 88 | | 12 | 14 | Stearyldimethylbenzyl ammonium chloride. | 1 |
| F | 88 | | 12 | 14 | Anionic [4] | 1 |
| G | 88 | | 12 | 14 | MA.HCl [3] | [2] 1 |
| H | 80 | | 20 | 23 | Anionic [4] | 1 |

[1] Hydrochloride salt of dodecylamine.
[2] Calculated as free amine.
[3] Hydrochloride salt of a commercial mixture of 16–18 carbon atom primary alkylamines consisting of approximately 10% hexadecylamine, 10% octadecylamine, 35% octadecenylamine and 45% octadecadienylamine.
[4] Sodium salt of an alkylaryl polyether sulfonate.

RUBBERY POLYMER A

A rubbery butadiene-styrene-methacrylic acid terpolymer containing approximately 7.3 carboxyl groups for each 100 monomeric units in the polymer chain is prepared as follows:

Two hundred parts of oxygen-free water, 5 parts of dodecylamine (neutralized with about a 10% stoichiometric excess of hydrochloric acid) and 0.3 part of potassium persulfate are charged to a pressure-resistant glass vessel. The reaction atmosphere is swept free of oxygen with a stream of nitrogen and 70 parts of butadiene, 20 parts of styrene, 10 parts of methacrylic acid and 0.3 part of t-dodecyl mercaptan are charged to the vessel. The polymerization vessel is rotated end-over-end at a temperature of 50° C. until all of the monomers are converted to polymer.

RUBBERY POLYMERS B—J

Additional rubbery polymers are prepared following the procedure described above except for (1) modification of the monomer mixture charged to the polymerization, (2) the emulsifying agent employed or (3) the concentration of the emulsifying agent. Details of the polymerizations are set forth in Table II.

Table II

| Rubbery Polymer | Polymer Composition, Wt. Percent | | | Carboxyl Groups per 100 monomeric units | Polymerization Emulsifier | Emulsifier Concentration, parts/100 parts of monomers |
| --- | --- | --- | --- | --- | --- | --- |
| | Butadiene | Styrene | Methacrylic Acid | | | |
| B | 70 | 10 | 20 | 14 | DDA.HCl [1] | [2] 5 |
| C | 70 | | 30 | 21 | DDA.HCl | [2] 5 |
| D | 70 | 20 | 10 | 7 | DDA.HCl | [2] 2.5 |
| E | 70 | 20 | 10 | 7 | DDA.HCl | [2] 3.8 |
| F | 70 | 20 | 10 | 7 | DDA.HCl | [2] 7.5 |
| G | 70 | 20 | 10 | 7 | MA.HCl [3] | [2] 5.0 |
| H | 70 | 20 | 10 | 7 | Anionic [4] | 5.0 |
| I | 55 | 35 | 10 | 8 | ----do [4] | 5.0 |
| J | 70 | 15 | 15 | 11 | ----do [4] | 5.0 |

[1] Hydrochloride salt of dodecylamine.
[2] Calculated as free amine.
[3] Hydrochloride salt of a commercial mixture of 16–18 carbon-atom primary alkylamines consisting of approximately 10% hexadecylamine, 10% octadecylamine, 35% octadecenylamine and 45% octadecadienylamine.
[4] Sodium salt of alkylaryl polyether sulfonate.

In the subsequent discussion of the invention, the polymer blends that are prepared will be identified by two capital letters and two numerals. The first capital letter will identify the rigid polymer in the blend and the second capital letter will identify the rubbery polymer in the blend. The first numeral will identify the weight percent of the rigid polymer in the blend and the second number will identify the weight percent of the rubbery polymer in the blend. Thus, Polymer Blend AA (90/10) is a blend of 90 weight percent of Rigid Polymer A and 10 weight percent of Rubbery Polymer A.

All of the polymer blends subsequently reported are prepared by a standard procedure. The latexes of the rigid polymer and the rubbery polymer are admixed to provide an aqueous polymer dispersion containing, on a solids basis, the desired proportions of the two polymers and the polymer blend is recovered therefrom by drum-drying at a temperature of 160° C. The polymer flake so obtained is extruded at a stock temperature of 270–300° C. and pelletized. All physical properties reported are determined on injection molded samples.

EXAMPLE I

Polymer Blend FH (75/25) and Polymer Blend FH (70/30) are prepared and have the physical properties set forth in Table III.

Table III

| Polymer Blend | FH (75/25) | FH (70/30) |
| --- | --- | --- |
| Physical Properties: | | |
| Tensile at Yield, p.s.i. | 5,910 | 4,760 |
| Tensile at Fail, p.s.i. | 5,310 | 4,400 |
| Elongation at Yield, percent | 3.0 | 3.2 |
| Elongation at Fail, percent | 4.0 | 5.5 |
| Impact Strength, ½″ x ½″ Bar, Foot pounds/inch of notch [a] | 1.2 | 3.1 |
| Flexural Modulus×$10^{-5}$ p.s.i. | 3.1 | 2.7 |
| Heat Distortion Temp., °C. | 109 | 107 |
| Deformation Under Load, percent [b] | 2.3 | 2.3 |

[a] ASTM D256-47T (Method A).
[b] ASTM D621-51.

EXAMPLE II

Polymer Blend FI (65/35) is prepared and has the physical properties set forth below:

| | |
| --- | --- |
| Tensile at yield, p.s.i. | 4,880 |
| Tensile at fail, p.s.i. | 4,270 |
| Elongation at yield, percent | 3.6 |
| Elongation at fail, percent | 6.4 |
| Impact Strength, ½″ x ½″ bar, foot pounds/inch of notch [a] | 2.1 |
| Flexural modulus×$10^{-5}$ p.s.i. | 2.3 |
| Heat distortion temperature, °C. | 104 |
| Deformation under load, percent [b] | 2.3 |

[a] ASTM D256-47T (Method A).
[b] ASTM D621-51.

EXAMPLE III

Polymer Blend FJ (70/30) is prepared and has an impact strength of 2.5 foot pounds/inch of notch. Its other physical properties closely correspond to those of Polymer Blend FH (70/30) reported in Table III.

EXAMPLE IV

Polymer blend FJ (75/25) is prepared and has physical properties which closely correspond to those of Polymer Blend FH (75/25) reported in Table III.

EXAMPLE V

Polymer Blend HH (75/25) is prepared and has physical properties which closely correspond to Polymer Blend FH (75/25) reported in Table III.

EXAMPLE VI

Polymer Blend AA (65/35) and Polymer Blend FH (65/35) are prepared and have the physical properties reported in Table IV.

Table IV

| Polymer Blend | AA (65/35) | FH (65/35) |
| --- | --- | --- |
| Physical Properties: | | |
| Tensile at Yield, p.s.i. | 3,900 | 4,270 |
| Tensile at Fail, p.s.i. | 4,100 | 4,000 |
| Elongation at Yield, percent | 2.3 | 3.0 |
| Elongation at Fail, percent | 13.6 | 6.5 |
| Impact strength, ½″ x ½″ Bar, Foot pounds/inch of notch [a] | 5.7 | 3.8 |
| Flexural Modulus×$10^{-5}$ p.s.i. | 2.3 | 2.1 |
| Heat Distortion Temp., °C. | 100 | 105 |
| Deformation Under Load, percent [b] | 2.0 | 2.3 |

[a] ASTM D256-47T (Method A).
[b] ASTM D621-51.

It be noted that the impact strength and elongation at fail are much higher in Polymer Blend AA (65/35) than in Polymer Blend FH (65/35). These values indicate that moldings made from Polymer Blend AA (65/35) will be significantly tougher than moldings made from Polymer Blend FH (65/35). The other physical properties of the two polymer blends do not differ significantly from each other.

These polymer blends differ from one another primarily in that the rubbery polymer included in Polymer Blend AA (65/35) is prepared by an emulsion polymerization process in which a water soluble salt of a long chain aliphatic amine is employed as the emulsifying agent, whereas the rubbery polymer included in Polymer Blend FH (65/35) is prepared in the presence of an anionic emulsifying agent.

EXAMPLE VII

Polymer Blends AA (65/35), AB (65/35), AC (65/35), BA (65/35), BB (65/35), BC (65/35), CA (65/35), CB (65/35), CC (65/35), DA (65/35), DB (65/35) and DC (65/35) are prepared. Each of the polymer blends has good physical properties and in particular high impact strength.

EXAMPLE VIII

Polymer Blends AA (90/10), AA (80/20) and AA (73/27) and AA (55/45) are prepared in the manner described in Example I, Part A. All of the polymer blends have high impact strength.

EXAMPLE IX

Polymer Blends AA (65/35), AD (65/35), AE (65/35) and AF (65/35) are prepared. These polymer blends differ from one another only in the quantity of the dodecylamine hydrochloride emulsifier employed in the polymerization of the rubbery polymer. The impact strengths of the polymer blends as determined by ASTM D256–47T (Method A) are set forth in Table V.

*Table V*

| Weight Percent Amine Employed in Polymerization of Rubbery Polymer [1] | Impact Strength, Ft. lbs./in. of notch |
|---|---|
| 7.5 | 4.2 |
| 5.0 | 5.7 |
| 3.8 | 7.6 |
| 2.5 | [2] >8.0 |

[1] Based on the monomers.
[2] Too rough to break with the 4-lb. hammer employed in the test method.

These results indicate that the impact strength of these polymer blends is effected significantly by the quantity of aliphatic amine salt employed as the emulsifier in the polymerization of the rubbery polymer. Higher values are obtained as the concentration of the amine emulsifier is decreased.

EXAMPLE X

Polymer Blend EA (65/35) is prepared and has good physical properties and in particular a high impact strength.

EXAMPLE XI

Polymer Blend GG (65/35) is prepared and has physical properties which are substantially equivalent to the physical properties of Polymer Blend AA (65/35) reported in Table IV.

The rigid polymer component of the polymer blends of this invention is a water-insoluble polymer of a monovinylidene aromatic compound containing an average of approximately 3–35 and preferably 9–30 carboxyl groups for each 100 monomeric units in the polymer chain. Such polymers customarily are prepared by interpolymerizing a monovinylidene aromatic compound such as styrene with a monocarboxyl group-containing interpolymerizable alpha, beta ethylenically unsaturated compound such as acrylic acid, methacrylic acid, crotonic acid, etc. The rigid polymers can be prepared by any of the known polymerization methods, e.g., by the mass process, but preferably are manufactured by an emulsion polymerization process.

The rigid polymer also can be prepared by interpolymerizing the monovinylidene aromatic compound with an interpolymerizable alpha, beta ethylenically unsaturated monomer containing two or more carboxyl groups such as itaconic acid, fumaric acid, citraconic acid, methylene malonic acid, etc. Similarly, the rigid polymer can be prepared by interpolymerizing the monovinylidene aromatic compound with maleic acid or maleic anhydride, but special techniques must be employed to obtain a polymer containing more than 50 mol percent of the monovinylidene aromatic compound. For example, such polymers can be prepared by a solution polymerization process in which the monovinylidene aromatic compound is heated in solution with a free radical generating polymerization initiator and the maleic acid or maleic anhydride is added to the solution at a rate slower than the rate at which the monovinylidene aromatic compound will homopolymerize under the conditions employed.

As an alternative procedure, the monovinylidene aromatic compound can be interpolymerized with an alpha, beta ethylenically unsaturated monomer containing functional groups that are hydrolyzable to carboxyl groups, e.g., ester groups, amide groups, nitrile groups, etc. The resulting polymer subsequently is hydrolyzed by known methods to obtain free carboxyl groups.

The monovinylidene aromatic compound included in the rigid polymer preferably is styrene, but also may be vinyl naphthalene; ring-substituted alkylstyrenes in which the alkyl group contains up to about 3 carbon atoms, e.g., vinyl toluene, o-ethylstyrene, p-ethylstyrene, 2,4-dimethylstyrene, etc.; ring-substituted halostyrenes, e.g., o-chlorostyrene, p-chlorostyrene, o-bromostyrene, 2,4-dichlorostyrene, etc.; ring-substituted alkyl-ring-substituted halostyrenes, e.g., 2-chloro-2-methylstyrene, 2,6-dichloro-4-ethylstyrene, etc. or a mixture of two or more monovinylidene aromatic compounds, which mixture may include a monovinylidene aromatic compound which, by itself, will not readily interpolymerize with the carboxyl group containing monomer, e.g., alpha-methylstyrene or alpha-ethylstyrene. If desired, the rigid polymer may be a multicomponent interpolymer of (1) a monovinylidene aromatic compound such as styrene, (2) a carboxyl group-containing monomer such as methacrylic acid and (3) a noncarboxyl group-containing monomer such as vinylidene chloride, acrylonitrile, methyl methacrylate, etc., provided that the monomers are selected so that the multicomponent interpolymer obtained is hard and rigid so as to resemble polystyrene in physical properties. The monovinylidene aromatic compound should constitute at least about 50 weight percent of such multicomponent polymers.

The rubbery polymer component of the polymer blends of this invention is a polymer of a conjugated 1,3-diene containing an average of 1.5–30, preferably 5–22 and especially 7–12 carboxyl groups per each 100 monomeric units in the polymer chain. The rubbery polymer is customarily prepared by interpolymerizing a conjugated 1,3-diene with a carboxyl group-containing interpolymerizable alpha, beta, ethylenically unsaturated compound such as acrylic acid, methacrylic acid, crotonic acid, fumaric acid, methylene malonic acid, citraconic acid, itaconic acid, etc. Alternatively, the conjugated 1,3-diene can be interpolymerized with an alpha, beta ethylenically unsaturated compound containing functional groups that are hydrolyzable to carboxyl groups, e.g., ester groups, amide groups, nitrile groups, etc. The resulting polymer is subsequently hydrolyzed by known methods to convert the functional groups to carboxyl groups. A third method of introducing carboxyl groups into the rubbery polymer is to prepare a carboxyl-free polymer of the conjugated 1,3-diene and subsequently react this polymer with a carboxylating agent such as thioglycolic acid under oxidizing conditions as described in U.S. Patent 2,662,874. Still other methods of introducing carboxyl groups into the rubbery polymer of 1,3-diene will be apparent to those skilled in the art.

Butadiene is the preferred conjugated 1,3-diene to be employed in the preparation of the rubbery polymer, but other conjugated 1,3-dienes conforming to the formula below also may be employed:

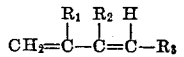

Where: $R_1$ and $R_2$ are independently selected from the group consisting of hydrogen, methyl radicals and ethyl radicals, and $R_3$ is selected from the group consisting of hydrogen and methyl radicals. Examples of such dienes include 1,3-pentadiene, isoprene, 2-ethylbutadiene, 2,3-dimethylbutadiene, etc.

It is customary and preferable to employ a terpolymer as the rubbery polymer component of the polymer blends. In addition to the conjugated 1,3-diene and the carboxyl group containing monomers, such terpolymers will contain a third monomer such as a monovinylidene aromatic compound, e.g., styrene or alpha-methylstyrene, an acrylate ester, e.g., ethyl acrylate, a methacrylate ester, e.g., methyl methacrylate, etc. In some cases a small quantity of divinyl benzene may be incorporated in the rubbery polymer to provide a small degree of cross-linking.

The percentage of the conjugated 1,3-diene included in the rubbery polymer must be such that it will be "rubbery," i.e., have a brittle temperature of 0° C. or lower (as determined by ASTM D746–52T). For example, in butadiene-styrene-methacrylic acid terpolymers, the butadiene must constitute about 50 weight percent of the polymer to meet this specification. In other polymer systems, the minimum percentage of the conjugated 1,3-diene required for this purpose may be either higher or lower depending upon numerous factors which will be apparent to those skilled in the art. As used in the appended claims, it will be understood that the term "rubbery polymer of a conjugated 1,3-diene" is restricted solely to those polymers having a brittle temperature of 0° C. or lower.

The rubbery polymer is preferably prepared by interpolymerizing a conjugated 1,3-diene with a carboxyl group containing interpolymerizable alpha, beta, ethylenically unsaturated compound such as acrylic acid by an emulsion polymerization process. The emulsifying agent employed in the polymerization may be any of the well known types conventionally employed in such polymerizations, but it has been noted that the physical properties of the polymer blends are significantly superior when the emulsifying agent employed in the polymerization of the rubbery polymer is a water-soluble salt of a long chain aliphatic amine, cf. see Example VI. The aliphatic amine employed in this preferred embodiment of the invention will contain at least 8 and preferably at least 12 carbon atoms and in general will contain not more than about 20 carbon atoms. Such amines may contain olefinic unsaturation, but in general it is preferred to use the substantially completely saturated aliphatic amines. Typical examples of such amines include octylamine, decylamine, dodecylamine, octadecylamine and mixtures of amines such as those derived from natural fats or the fatty acids obtainable therefrom. Essentially any of the water-soluble salts of such amines may be employed with the most convenient and economical salt being the hydrochloric acid salt. Typical of other suitable amine salts are the sulfuric acid salt, the phosphoric acid salt, the formic acid salt, the acetic acid salt, etc.

As is set forth in Example IX, the impact strengths of the polymer blends of the invention increase as the quantity of amine used in the polymerization of the rubbery polymer is decreased. Consequently, it is desirable to employ the minimum quantity of amine salt that will produce a rubbery latex of sufficient stability to be handled. Usually it is necessary to employ about 2 parts of amine per 100 parts of monomers and it is seldom desirable to employ more than about 8 parts of amine. Preferably, 2.5–5.0 parts of amine will be used per 100 parts of monomers. It is to be noted that the above limits are expressed on the basis of the amine itself and not its salt.

The emulsion polymerization of the rubbery polymer is carried out in the conventional manner. The ratio of water to monomers may vary from about 1:1 to about 9:1, but is ordinarily set in the range of about 1.5:1 to about 2:1. The polymerization initiators employed are normally free radical generating initiators such as benzoyl peroxide, lauryl peroxide, ditertiary butyl peroxide, potassium persulfate, hydrogen peroxide, cumene hydroperoxide, redox initiator systems, etc. If desired, polymerization regulators such as long-chained aliphatic mercaptans and other conventional components of emulsion polymerization systems may be included.

The preferred polymer blends of this invention are those in which the rigid polymer is an interpolymer of styrene and a carboxyl group-containing monomer selected from the group consisting of acrylic acid, methacrylic acid, and mixtures thereof and the rubbery polymer is an interpolymer of butadiene and a carboxyl group-containing monomer selected from the group consisting of acrylic acid, methacrylic acid, and mixtures thereof. Especially preferred polymer blends are those in which the rigid polymer is an interpolymer of 75–95% styrene and 5–25% of either acrylic or methacrylic acid and the rubbery polymer is an interpolymer of 60–75% butadiene, 10–20% styrene and 5–20% of either acrylic or methacrylic acid. In another embodiment of the invention the rigid polymer is an interpolymer of 40–75% styrene, 15–45% alpha-methylstyrene and 5–25% of either acrylic or methacrylic acid and the rubbery polymer is an interpolymer of 60–75% butadiene, 10–30% styrene and 5–20% of either acrylic or methacrylic acid.

The proportions of the rigid polymer and the rubbery polymer included in the polymer blends of this invention can be varied widely. In all cases, however, the rubbery polymer will be included in the polymer blend in an amount such that the blend has an impact strength higher than the impact strength of the rigid polymer of the monovinylidene aromatic compound included therein. In most cases, the rigid polymer will constitute more than 50%, by weight, of the polymer blend and ordinarily will constitute 60–95% and preferably 60–85%, by weight, of the blend with the rubbery polymer constituting the balance of the blend.

The particular manner in which the two polymers are blended together is not critical so long as the polymers are well dispersed within one another. The most facile method for obtaining such an intimate blend is to admix latexes of the rigid polymer and the rubbery polymer before recovering the two polymers from the aqueous emulsions in which they are prepared. In this method of blending the polymers, it is desirable to employ latexes in which the polymer particles carry the same electrical charge to prevent premature coagulation of the polymers. Alternatively, the polymers may be recovered separately and subsequently blended together in mechanical mixing equipment such as rubber mills, extruders, etc. In still another embodiment of the invention, a polymer blend containing a high percentage of the rubbery polymer may be prepared by a latex blending technique and this blend then may be admixed with additional quantities of the rigid polymer by mechanical means.

If desired, the polymer blends of this invention may be admixed or blended with other polymers, e.g., noncarboxyl group-containing rigid polymers of monovinylidene aromatic hydrocarbon compounds such as styrene, noncarboxyl group-containing rubbery polymers of conjugated 1,3-dienes, etc. Colorants, stabilizers, anti-oxidants, lubricants, plasticizers, inorganic fillers and other conventional plastic compounding agents may be included in the polymer blends if desired.

The polymer blends of this invention can be employed in the manufacture of high strength injection moldings, in the manufacture of extruded sheets and for the manufacture of other high strength articles by methods well known in the art.

The above description and particularly the examples are set forth by way of illustration only. Many other variations and modifications thereof will be apparent to those skilled in the art and can be made without departing from the spirit and scope of the invention herein described.

This application is a continuation in part of my copending application Ser. No. 517,920, filed June 24, 1955, now abandoned.

What is claimed is:

1. An intimate blend of thermoplastic polymeric materials consisting essentially of (1) greater than 50% of a rigid, water-insoluble polymer of a monovinylidene aromatic compound containing an average of 3-35 carboxyl groups per each 100 monomeric units in the polymer chain and (2) less than 50% by weight of a rubbery polymer of a conjugated 1,3-diene containing an average of 1.5-30 carboxyl groups per each 100 monomeric units in the polymer chain, said conjugated 1,3-diene conforming to the formula:

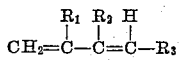

Where: $R_1$ and $R_2$ are independently selected from the group consisting of hydrogen, methyl radicals and ethyl radicals, and $R_3$ is selected from the group consisting of hydrogen and methyl radicals, said rubbery polymer of a conjugated 1,3-diene having a brittle temperature not higher than about 0° C., (as determined by ASTM test D746-52T), said rubbery polymer being present in the polymer blend in such an amount that the impact strength of the polymer blend (as determined by ASTM test D256-47T) is greater than the impact strength of the rigid, water-insoluble polymer of a monovinylidene aromatic compound contained therein.

2. An intimate blend of thermoplastic polymeric materials consisting essentially of (1) 60-95% of a rigid, water-insoluble interpolymer of a monovinylidene aromatic compound and an interpolymerizable alpha, beta ethylenically unsaturated compound containing at least one carboxyl group, said interpolymer containing an average of 3-25 carboxyl groups per each 100 monomeric units in the polymer chain, and (2) 40-5% of a rubbery interpolymer of a conjugated 1,3-diene and an interpolymerizable alpha, beta, ethylenically unsaturated compound containing at least one carboxyl group, said interpolymer containing an average of 1.5-30 carboxyl groups per each 100 monomeric units in the polymer chain, said conjugated 1,3-diene conforming to the formula:

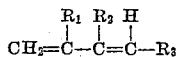

Where: $R_1$ and $R_2$ are independently selected from the group consisting of hydrogen, methyl radicals and ethyl radicals, and $R_3$ is selected from the group consisting of hydrogen and methyl radicals, said rubbery interpolymer of a conjugated 1,3-diene having a brittle temperature not higher than about 0° C., (as determined by ASTM test D746-52T).

3. The composition of claim 2 in which the water-insoluble interpolymer of the monovinylidene aromatic compound contains an average of 9-30 carboxyl groups per each 100 monomeric units in the polymer chain and the rubbery interpolymer of the conjugated 1,3-diene contains an average of 5-22 carboxyl groups per each 100 monomeric units in the polymer chain.

4. The composition of claim 3 in which the water-insoluble interpolymer of the monovinylidene aromatic compound is an interpolymer of styrene and a monomer selected from the group consisting of acrylic acid, methacrylic acid and mixtures thereof and the rubbery interpolymer of the conjugated 1,3-diene is an interpolymer of butadiene and a monomer selected from the group consisting of acrylic acid, methacrylic acid and mixtures thereof.

5. The composition of claim 2 in which the rubbery polymer is prepared by an emulsion polymerization process in which the emulsifying agent employed therein is a water-soluble salt of an aliphatic amine containing 8-20 carbon atoms.

6. An intimate blend of thermoplastic polymeric materials consisting essentially of (1) 60-95% of a rigid polymer and (2) 40-5% of a rubbery polymer; said rigid polymer being an interpolymer of 75-95% styrene and 5-25% of a monomer selected from the group consisting of acrylic acid, methacrylic acid and mixtures thereof; said rubbery polymer being an interpolymer of 60-75% butadiene, 10-30% styrene and 5-20% of a monomer selected from the group consisting of acrylic acid, methacrylic acid and mixtures thereof.

7. An intimate blend of thermoplastic polymeric materials consisting essentially of (1) 60-85% of a rigid polymer and (2) 40-15% of a rubbery polymer; said rigid polymer being an interpolymer of 75-95% styrene and 5-25% methacrylic acid; said rubbery polymer being an interpolymer of 60-75% butadiene, 10-30% styrene and 5-20% methacrylic acid.

8. An intimate blend of thermoplastic polymeric materials consisting essentially of (1) 60-95% of a rigid polymer and (2) 40-5% of a rubbery polymer; said rigid polymer being an interpolymer of 40-75% styrene, 15-45% alpha-methylstyrene and 5-25% of a monomer selected from the group consisting of acrylic acid, methacrylic acid and mixtures thereof; said rubbery polymer being an interpolymer of 60-75% butadiene, 10-30% styrene and 5-20% of a monomer selected from the group consisting of acrylic acid, methacrylic acid and mixtures thereof.

9. The method for preparing the compositions of claim 2 which comprises the steps of (1) intimately admixing an aqueous dispersion of a rigid polymer with an aqueous dispersion of a rubbery polymer and (2) separating and recovering the mixed solid polymers from the admixed aqueous dispersion of step (1); the aqueous dispersion of the rigid polymer containing 60-95 parts of a water-insoluble interpolymer of a monovinylidene aromatic compound and an interpolymerizable alpha, beta ethylenically unsaturated compound containing at least 1 carboxyl group, said interpolymer containing an average of 3-35 carboxyl groups per each 100 monomeric units in the polymer chain; the aqueous dispersion of the rubbery polymer containing 40-5 parts of an interpolymer of a conjugated 1,3-diene and an interpolymerizable alpha, beta ethylenically unsaturated compound containing at least 1 carboxyl group, said interpolymer containing an average of 1.5-30 carboxyl groups per each 100 monomeric units in the polymer chain, said conjugated 1,3-diene conforming to the formula:

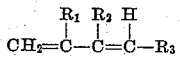

Where: $R_1$ and $R_2$ are independently selected from the group consisting of hydrogen, methyl radicals and ethyl radicals and $R_3$ is selected from the group consisting of hydrogen and methyl radicals; the polymer particles in both aqueous pollmer diseprsions carrying the same electrical charge.

References Cited in the file of this patent

UNITED STATES PATENTS

| | | |
|---|---|---|
| 2,419,202 | D'Alelio | Apr. 22, 1947 |
| 2,457,097 | Te Grotenhuis | Dec. 21, 1948 |

UNITED STATES PATENT OFFICE
CERTIFICATE OF CORRECTION

Patent No. 2,944,044            July 5, 1960

Massimo Baer

It is hereby certified that error appears in the printed specification of the above numbered patent requiring correction and that the said Letters Patent should read as corrected below.

Column 4, line 55, for "It be" read -- It will be --; column 8, line 15, for "10-20%" read -- 10-30% --; column 9, line 33, for "3-25" read -- 3-35 --; column 10, line 61, for "pollmer diseprsions" read -- polymer dispersions --.

Signed and sealed this 10th day of January 1961.

(SEAL)
Attest:

KARL H. AXLINE            ROBERT C. WATSON
Attesting Officer            Commissioner of Patents